United States Patent

Langston et al.

Patent Number: 5,861,576
Date of Patent: Jan. 19, 1999

[54] CABLE RACEWAY CABLE EXIT BOX

[75] Inventors: Daniel A. Langston, Elma; John Messer, Tonawanda, both of N.Y.

[73] Assignee: Mono-Systems, Inc., Rye Brook, N.Y.

[21] Appl. No.: 880,857

[22] Filed: Jun. 23, 1997

Related U.S. Application Data

[63] Continuation of Ser. No. 646,875, May 8, 1996, abandoned.

[60] Provisional application No. 60/002,357 Aug. 15, 1995.

[51] Int. Cl.⁶ .................................................. H02G 3/04
[52] U.S. Cl. .................................................. 174/48
[58] Field of Search ........................ 174/48, 49; 439/118; 220/3.8; 108/50

[56] References Cited

U.S. PATENT DOCUMENTS

| | | | |
|---|---|---|---|
| 2,023,433 | 12/1935 | McConnell | 247/3 |
| 3,131,512 | 5/1964 | MacLeod, Jr. | 50/127 |
| 3,725,568 | 4/1973 | Stanley | 174/48 |
| 4,017,137 | 4/1977 | Parks | 339/21 R |
| 4,059,328 | 11/1977 | Rigo | 339/112 R |
| 4,338,484 | 7/1982 | Littrell | 174/48 |
| 5,024,614 | 6/1991 | Dola et al. | 439/114 |
| 5,362,923 | 11/1994 | Newhouse et al. | 174/48 |
| 5,403,974 | 4/1995 | Leach et al. | 174/48 |
| 5,606,919 | 3/1997 | Fox et al. | 108/50 |
| 5,629,496 | 5/1997 | Navazo | 174/48 |

*Primary Examiner*—Bot L. Ledynh
*Assistant Examiner*—Joseph Waks
*Attorney, Agent, or Firm*—Ostrolenk, Faber, Gerb & Soffen, LLP

[57] ABSTRACT

A combination of a cable raceway section with a cable exit box, wherein the raceway section is C shaped with one side having a gap in it. A cable exit box at the gap in the side of the raceway section. The box has an opening in one wall overlying the gap in the side of the raceway section and both the gap and the opening are of a length enabling a wide radius turn of cable out of the raceway section and into the box. The box is deeper than the raceway. The box has an open interior defined by sides shaped for supporting a wiring device in the opening, to which wiring device cables exiting from the raceway section are attached.

7 Claims, 1 Drawing Sheet

CABLE RACEWAY CABLE EXIT BOX

CROSS REFERENCE TO APPLICATIONS

This is a Continuation of application Ser. No. 08/646,875 filed on May 8, 1996, now abandoned, which is based upon U.S. Provisional Application No. 60/002,357, filed Aug. 15, 1995, now abandoned.

BACKGROUND OF THE INVENTION

The present invention relates to a cable tray or cable raceway comprised of several elongate, generally U or C shaped sections which are clamped end to end to produce the cable raceway. Where some of the cable or wiring is required external to the raceway for connection to a wiring device at a particular location, typically either holes are field drilled into the side of the raceway or knockouts are provided as part of the manufacturing process and can be removed. A conduit bushing is put into each hole through which the cable exits the raceway. Use of bushings causes a tight or small radius turn in the cable, which could possibly damage it.

As an alternative to merely drilling holes, it is known to install a cable raceway cable exit box either directly in the raceway or sometimes to one lateral side of the raceway. A usually narrow, often tubular opening is provided between the raceway and the exit box, which has the above mentioned drawback of forming a tight turn in the cable. Further, the exit box for the cable raceway may sometimes be deep, front to back of the raceway, in order to house a wiring device to which some of the cables in the raceway would be attached. Examples of such wiring devices include various switches, plug sockets, electric components, illumination devices connected to optical fiber cables, any power or communications device, etc. In order to house a cable exit box, which is deep in order to contain a deep wiring device, and especially where the exit box is installed in the raceway, a deeper than normal raceway is needed to house the deep box. This is undesirable because extra material is required for the raceway which makes it more expensive, and the cable raceway greater depth may make it more difficult to conceal in a wall, ceiling, or the like.

U.S. Pat. No. 4,338,484 teaches a first wire channel with an adjacent second wire channel disposed along one side, with gaps in the abutting sides of the two channels through which a wire may pass. The additional channel is not an exit box adapted to receive any wiring device, and the depth of the additional channel is substantially that of the first channel, since support of a wiring device in either channel is not contemplated.

U.S. Pat. No. 5,403,974 shows access from a cable channel to a wiring device. It does not suggest a cable exit box adapted for supporting a wiring device therein and at the raceway section.

U.S. Pat. No. 3,725,568 shows a conventional cable exit from a cable raceway. See also U.S. Pat. Nos. 3,131,512 and 2,023,433 to similar effect.

SUMMARY OF THE INVENTION

The invention has several objects, including avoiding tight turns in cables entering the cable exit box, avoiding the need for a possibly deeper cable raceway sized according to the depth of the cable exit box, possibly providing an integral one piece design without an add on exit box, and other objects which will become apparent from the following description of the invention. Another object is to be able to position a wiring device at a desired height position off the rear surface of the raceway section.

According to the invention, the cable raceway cable exit box is provided outside one lateral side of a generally C-shaped or U-shaped cable raceway section. The web of the C shape is fastened to a support typically located behind a wall or a ceiling. The open front of the cable raceway section is closed by a cover, e.g. a cover that attaches to the ends of the arms of the C. The cable raceway section may have a desired depth between the rear surface and the front cover for a particular use, and the raceway need not be deep front to back or wider laterally side to side than is required for transmitting a specified set of cables to a set of wiring devices.

To communicate from the raceway section into the cable exit box, the respective side of the raceway above which the exit box is disposed includes a gap which is of a relatively long length along the raceway, is significantly longer than the thickness of the cables, and approximates the length of the exit box, so that selected cables can be bent out of the raceway section and into the exit box with a gradual radius, rather than a sharp turn. This is useful with wires and especially beneficial with thick cables, with optical fibers and communication wiring requirements. A wiring device installed in the exit box can then be connected to the cables in the box. The cable raceway section with a cable exit box installed at one side may be produced as one piece for being installed between other sections of the raceway or the exit box may be installed on a raceway section, e.g., by being snapped into place, where needed.

The invention permits the exit box to be installed on the raceway without affecting the integrity of the raceway. It also eliminates the need for difficult and labor intensive raceway penetrations and avoids unsightly conduit connections, all of which will be inside the raceway or the exit box adjacent the raceway. The large opening communicating between the raceway section and the cable exit box offers ample room for demanding radius requirements and a deep box or even an extra deep box can receive rear wired wiring devices installed in the box to which the cable is to be attached. Even with a deep box attached on it, the rest of the raceway section can be of short height front to back. The invention is also useful for holding standard power wiring and communication devices. Especially when the exit box is attachable to the raceway section, the box size and depth for a particular raceway section may be selected so that no matter how tall is the wiring device, it can be placed in the exit box. In a shallow exit box, a wiring device can be installed above the raceway (almost forward of the raceway section) while maintaining the integrity of the parts of the raceway section. But the exit box may also be no taller front to back than the raceway section.

Since the exit box is at a lateral side of the raceway, the invention brings the wiring devices out of the raceway and out of the wiring path. This alleviates wiring congestion in the raceway and avoids installation complications. The configuration is universal in permitting mounting of the cable exit box at either side of the raceway section.

Other objects and features of the present invention will become apparent from the following description of a preferred embodiment considered in conjunction with the accompanying drawings:

DESCRIPTION OF A PREFERRED EMBODIMENT

Figure 1:
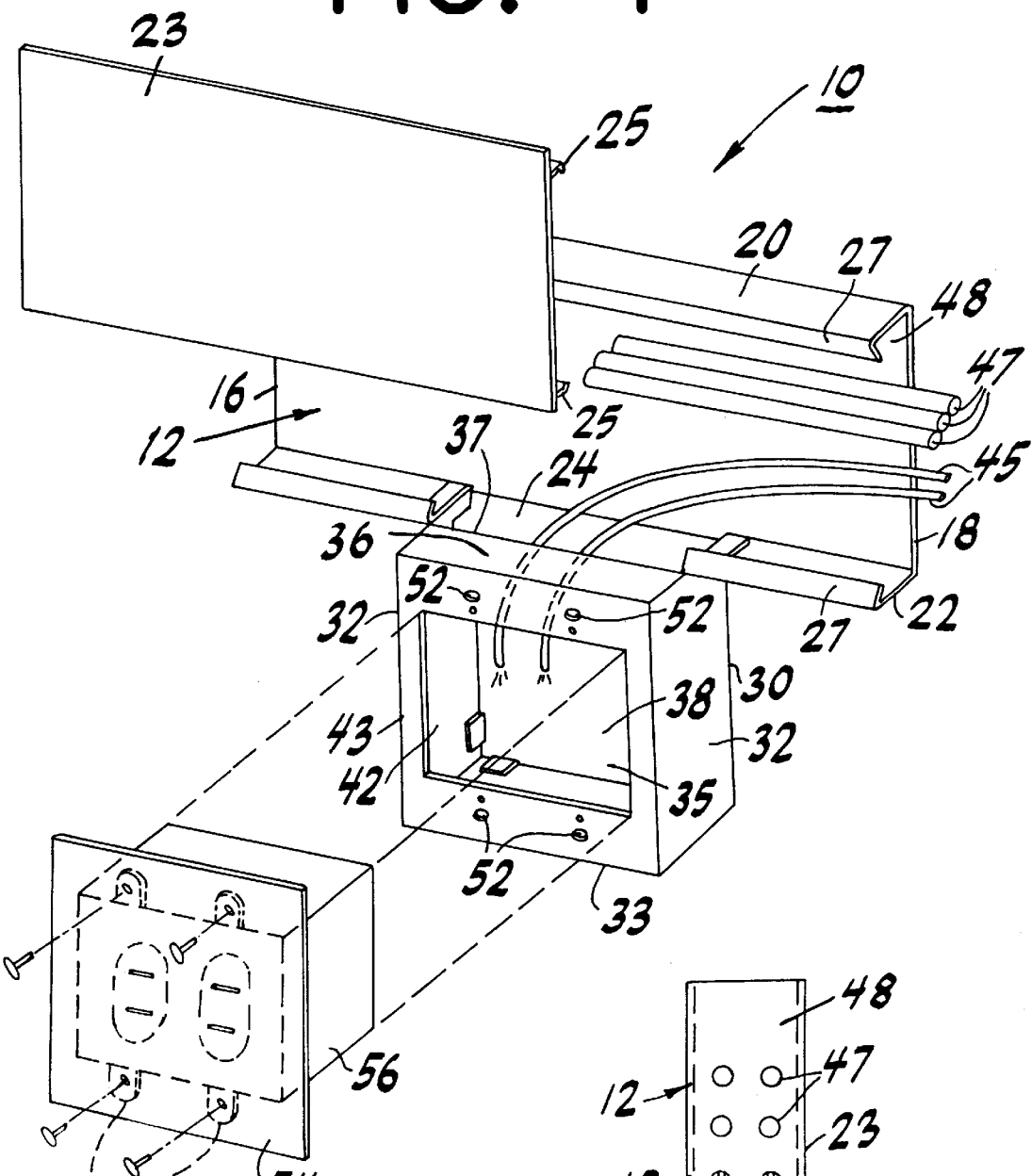
FIG. 1 is a perspective view of a section of a cable raceway with a cable exit box installed thereon, according to the invention.
Figure 2:
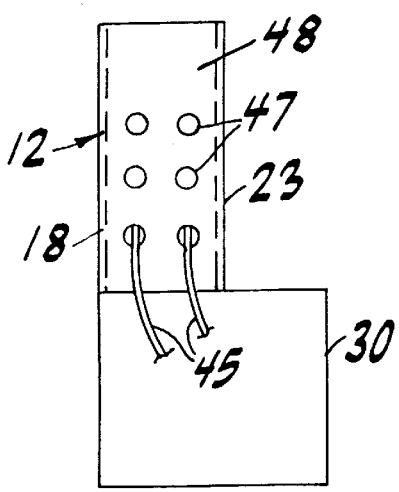
FIG. 2 is an end view of the cable raceway section with a cable exit box.

The cable raceway section and box assembly 10 includes the present invention and is part of an otherwise conventional cable raceway which is provided with the invention at least at one, or more usually at many, intervals along its length. A typical cable raceway section 12 including the invention has opposite ends 14 and 16 that are clamped to other similar raceway sections, not shown, of corresponding cross-section and of conventional length for defining a continuous cable raceway of a length required for a particular installation. However, the raceway section with the below described cable exit box 30 may be provided with end plates (not shown) on the ends of the raceway section so that the raceway section can be used as a stand alone component, e.g., at a piece of equipment requiring a wiring device present, like over a laboratory work bench. The raceway section 12 has a base or web side 18 which is fastened to a support, not shown, which may include a column or beam of a building frame, or behind a wall or ceiling, or any other support to which the base of a cable raceway might be attached. The raceway section is here shown oriented horizontally. At both of the top and bottom edges of the base 18, there are two upstanding, short height sides 20 and 22, from which the raceway section has a generally U or C-shaped cross section. The specific shape of the raceway cross section is not significant here, so long as it has at least one side at which the below described cable exit box 30 may be positioned. The open or outer side of the raceway section may be conventionally closed by a cover 23. The cover includes flanges 25 on its inwardly facing side that are positioned and shaped to cooperate with underturned flanges 27 at the free outer edges of the sides 20 and 22 to secure the cover enclosing the space inside the cable raceway through which the cables extend.

At a selected location along the cable raceway section 12, its side 22 is removed defining a gap 24 through the side through which cable may exit from the raceway. The length of the gap 24 is somewhat longer than one conventionally sees in cable raceway, which enables a cable to be passed through the gap turned on a wide radius. The preferred maximum length for the gap 24 is approximately the length of the below described exit box to be attached to the raceway.

A cable exit box 30 is possibly integrally formed with or subsequently attached on the lateral outside of the raceway section side 22. The box 30 has six sides. These include two lateral sidewalls 32 and a bottom wall 33. The rear side of the box is closed by a panel 35 which would be at the same depth as the base 18 of the raceway section 12. Preferably, the walls 32 and 33 have a front to back height or depth that begins at the level of the rear panel 35 of the box, which is at the base 18 of the raceway section, and extends forward past the flange 27 on the side 22, making the box 30 deeper than the cable raceway section of which it is a part. Holes or knockouts for holes may be provided for access into the box. For example, it may be desired to bring additional electric conduit into the box from a source other than the raceway and that can be done through the holes.

The depth of the box 30 is selected so that standard wiring and/or communication devices can be installed in the box without box extensions or modifications. Hence, different box interior designs and box depths are selected for expected installations and wiring devices. The box depth or overall configuration need not be of one size or shape and could differ at different locations along the raceway and in different applications. The box depth may be selected to be deeper than, the same depth as, or even shallower than the depth of the raceway section.

Peripheral sidewall 36 of the box 30 is open at the opening 37. That opening is the same size as and overlaps the gap 24 in the side 22. The opening 37 in the sidewall 36 has the same length and front to back height as the gap 24, providing a cable exit opening from the raceway section and into the exit box 30.

The box 30 has an open interior volume 38 defined by internal sidewalls 42 which are supported between the front wall 43 and the rear panel 35 of the exit box. The internal walls 42 are spaced inward from the peripheral sidewalls 32, 33, 36. The walls 42 are dimensioned and shaped to correspond to the periphery of a conventional wiring device 56 to be installed in the box, so that the walls 42 will hold the wiring device against shifting. The walls 42 defining the volume 38 enable the wiring device 56 to be installed in the box 30 without the use of auxiliary components to support it, such as a junction box or a bracket for supporting the device. This internal support or frame may include a physical lock on the wiring device, so that a wiring device bracket is not required.

The gap 24 in the side 22 and the corresponding opening 37 in the wall 36 of the box 30 permit selected cables 45 passing through the raceway to be bent around a wide radius, if desired, through the long gap 24 and opening 37 and into the interior 38 of the box 30. Other cables 47 continue along the open area 48 in the raceway section to where the cables are needed.

An optional ground post, not shown, may be made integrally with the box or attached elsewhere or otherwise on the raceway section.

As noted above, the box 30 may be integrated with the raceway section 12 or may be a snap in place or otherwise attachable element having a common external dimension and the opening 37, but an interior volume 38 which is sized and shaped for receiving a particular type of wiring device. As several different types of wiring devices, communication devices, etc., may be used, such as a plug in socket, a circuit protection device, a connector to other apparatus, etc., exit boxes 30 with appropriately profiled open volumes 38 may be available for installation at a particular raceway section 12.

A pattern of holes 52 on the front face 43 of the box 30 are adapted to receive fastening screws or the like from standard cover plates 54 that are positioned over the wiring device 56 which is installed in the open volume 38.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A combination of a cable raceway section with a cable exit box, comprising:

the raceway section having a rear side by which the raceway section may be mounted to a surface, a front side opposite the rear side and further comprising at least one lateral side shaped for defining a raceway along which cables may pass; the rear front and lateral sides extending in a direction that is along the raceway section;

the at least one lateral side having a gap therein of a first length in the direction along the raceway section and of a first shorter height above the rear side of the raceway section for permitting passing of at least one of the cables from within the raceway section through the gap to outside the raceway section;

the cable exit box being disposed at the at least one lateral side of the raceway section and outside of the raceway section; the box having sides defining the box; the box having a rear side toward the surface to which the box is mounted; one of the box sides being at the at least one of the lateral sides of the raceway section, the one of the box sides having a second taller height which is greater than the first height above the rear side of the box for providing the box with an open volume with a depth sufficient for enabling reception of a wiring device to be contained in the box;

the one of the box sides having an opening therein beginning at the rear side of the box and overlying the gap in the at least one lateral side of the raceway section for providing a continuous open path for the at least one of the cables from within the raceway section through the gap in the one lateral side of the raceway section, through the opening in the one of the box sides and into the box; the one of the box sides has a length dimension along the at least one lateral side of the raceway section, the length of the opening in the one of the box sides is generally the full length dimension of the one of the box sides along the at least one lateral side of the raceway section, the opening in the one of the box sides extends along and covers the gap in the at least one lateral side of the raceway section and both the opening and the gap are substantially of the same first length, and both the opening in the one box side and the gap in the one lateral side of the raceway section have the same first height above the surface on which the raceway section is mounted;

the box having the open volume communicating with the opening in the one of the box sides; the box including means therein for receiving and supporting the wiring device in the volume so that the device can be connected to the cable;

whereby the wiring device may be supported in the box and the cable may pass from within the raceway section into the box to be connected with and communicate with the wiring device supported in the box.

2. The combination of claim 1, wherein the raceway section is of generally C shape, having the one lateral side as one arm thereof, an opposite second lateral side spaced away from the one lateral side, and a base at the rear side joining the one and second lateral sides, wherein the base of the raceway section is attachable to a support.

3. The combination of claim 2, further comprising a cover over the front side of the raceway section and supported by the one and the second lateral sides.

4. The combination of claim 1, further comprising a cover over and enclosing the raceway section, the cover being attached at the one lateral side of the raceway section.

5. The combination of claim 1, wherein the means for supporting a wiring device in the volume of the box comprising the box having an interior profile shaped for contacting and supporting a selected wiring device in the volume.

6. The combination of claim 1, wherein the at least one lateral side also is of the first height and the first height is selected so that the gap in the one lateral side of the raceway section extends over the first height of the at least one lateral side of the raceway section.

7. The combination of claim 1, wherein the raceway section and the cable exit box are together in one piece.

* * * * *